Jan. 22, 1929.

E. SKILLMAN 1,699,574

MECHANICAL MOVEMENT

Filed July 24, 1926

Inventor
EDWARD SKILLMAN

By his Attorney
Edmund G. Borden

Jan. 22, 1929.

E. SKILLMAN 1,699,574

MECHANICAL MOVEMENT

Filed July 24, 1926

Inventor
EDWARD SKILLMAN

By his Attorney
Edmund G. Borden

Jan. 22, 1929.  E. SKILLMAN  1,699,574
MECHANICAL MOVEMENT
Filed July 24, 1926   4 Sheets-Sheet 4

Inventor
EDWARD SKILLMAN
By his Attorney
Edmund G. Borden

Patented Jan. 22, 1929.

1,699,574

UNITED STATES PATENT OFFICE.

EDWARD SKILLMAN, OF BARTLESVILLE, OKLAHOMA.

MECHANICAL MOVEMENT.

Application filed July 24, 1926. Serial No. 124,557.

This invention relates to mechanical movements, and more particularly to mechanical movements for varying the length of stroke of a driving or driven mechanism.

In many different forms of machinery such as windmills, pumps, shapers, ratchets, power saws, valve gears, compressors, etc., as well as apparatus, it is necessary to vary or adjust the kind of operation or the extent of movement of a part or parts. For example, in the operation of a windmill or a power saw, which involves the use of an oscillating or reciprocating movement, it is very desirable that the amplitude of the oscillation or reciprocation may be varied in order to vary the character of the work being done or to better or more efficiently utilize a variable force being applied.

The primary object of the present invention is to provide a mechanical movement by which the character of movement of a driven part in a mechanism may be varied during the continued operation of the mechanism.

Another object of the invention is to provide a mechanical movement by which the amplitude of an oscillating or reciprocating member may be varied during the continued operation of the member.

A further object of the invention is to provide a mechanical movement by which the length of the stroke of an oscillating part may be varied during the continued operation of the part wherein a force is exerted by the load tending to move the mechanism into short stroke position.

Another object of the invention is to provide a mechanism by which the reciprocating stroke of a windmill may be automatically varied in accordance with the variation of the wind pressure or velocity.

With these and other objects in view the invention consists in the improved mechanical movement hereinafter described and particularly defined in the appended claims;

The various features of the invention are illustrated in the accompanying drawings in which.

Figure 1:
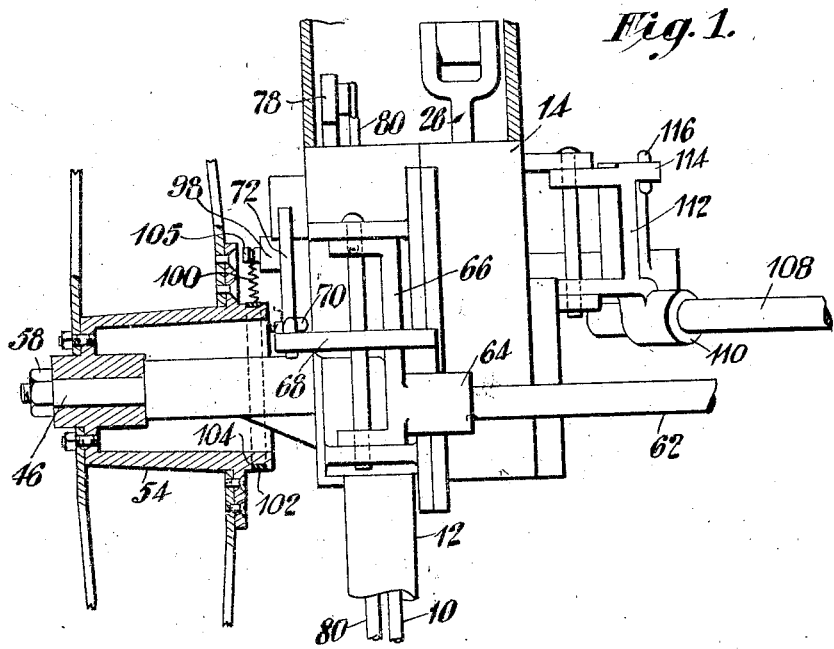
Fig. 1 is a view in side elevation with parts broken away, of a windmill driving mechanism employing a mechanical movement embodying the preferred form of invention.

One feature of the invention comprises a power driven means, a load connected with the driving means, and an adjustable mechanical movement in the connection between the load and the driving means by which the effect on the load may be varied during the continued operation of the driving means.

The mechanical movement which comprises the present invention has been embodied for purposes of illustration in a pumping mechanism which is operated by a wind wheel. The specific function of the mechanical movement shown in the drawings is to vary the length of the stroke of a pump rod which is used for pumping water under the power furnished by the wind wheel. The variation of the pumping stroke is affected automatically by means of a wind vane in order to better utilize the force exerted by the wind on the wind wheel.

Figure 2:
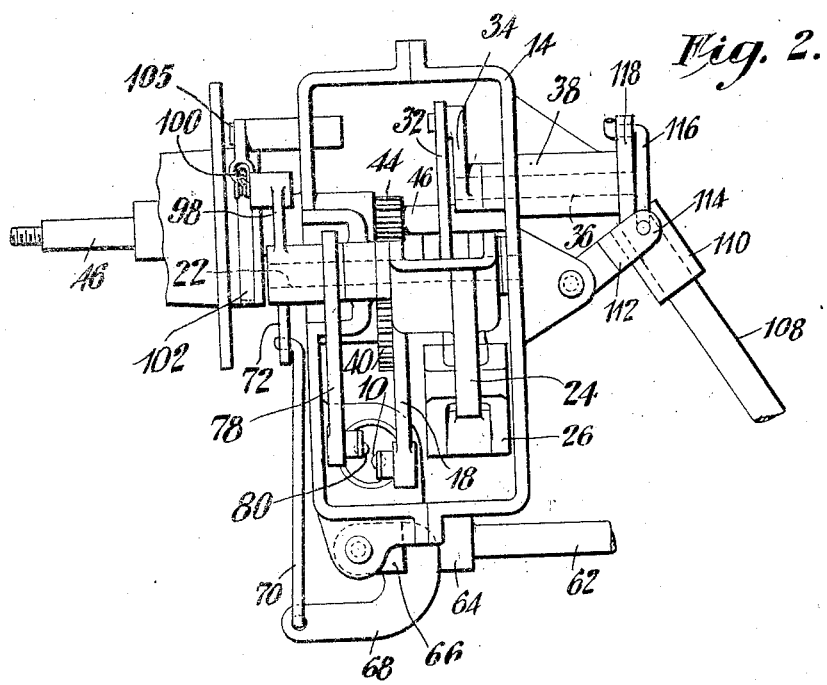
Fig. 2 is a top plan view of the driving mechanism shown in Fig. 1.
Figure 3:
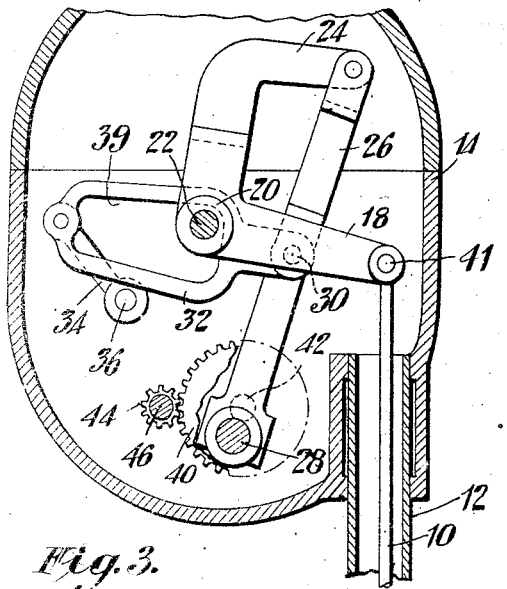
Fig. 3 is a view in side elevation with parts shown in section, illustrating the mechanical movement parts in a position to provide the long stroke movement of the pump rod.
Figure 4:
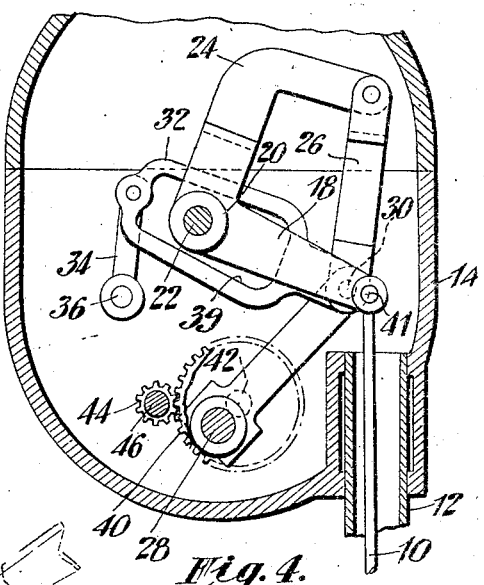
Fig. 4 is a view in side elevation with parts shown in section illustrating the mechanical movement parts in the position for providing the short stroke movement of the pump rod.

The mechanical movement of the present invention is illustrated more particularly in Figs. 3 to 6 inclusive. In the application of the mechanical movement to a wind mill pumping mechanism, the load or pump is connected to a rod 10 by which the operation of the pump may be carried on. The rod 10 passes from the pumping mechanism up to the top of a windmill tower and through a tube 12 mounted at the bottom of a casing 14, mounted on the top of a tower 16 as illustrated more particularly in Fig. 8. The upper end of the rod 10 is connected with an arm 18 which forms one part of a bell crank lever 20 which is pivoted on a journal 22 fixed in the casing 14. The shape and construction of the bell crank lever 20 are illustrated more particularly in Figs. 3 and 4. The lever is bifurcated and has bearing portions at each side of the bifurcation. Projecting upwardly from the yoke which connects the bearing portions of the lever 20 is an arm 24 which is connected by means of a toggle joint 26 with a crank 28 of a power driving mechanism. To the knuckle 30 of the toggle joint is connected one end of an adjusting link 32 which in turn is connected at its other end to an arm 34. The arm 34 is fixed to the inner end of a shaft 36 that is mounted in a bearing 38, Fig. 2, formed in the casing 14. The link 32 has an opening or slot 39 formed therein which surrounds the journal 22 upon which the bell crank lever 20 is pivoted. Also the link 32 is mounted to move between the bifurcated bearing parts of the bell crank lever. When the toggle joint 26 is in the position as illustrated in Fig. 3 the mechanical movement parts are in position for imparting the long stroke reciprocation to the pump rod 10 as the crank 28 revolves about its axis. If the adjusting link is moved to the right as illustrated in Fig. 4 the pivot point 30 will be moved toward the pivot 41 connecting the arm 18 and rod 10 to shorten the distance between the pivotal connections. As these pivoted connections approach each other the stroke of rod 10 will be shortened since the stroke of the crank 28 remains fixed. It is apparent that the further the link 32 is moved to the right, Figs. 3 and 4, the shorter will be the stroke of the rod 10 for each revolution of the crank 28 and vice versa. This construction in effect provides a lever of the third class in which the pivot 30 moves back and forth between the pivots 22 and 41 to vary the effective point of application of the driving crank to the lever 20.

Figure 5:
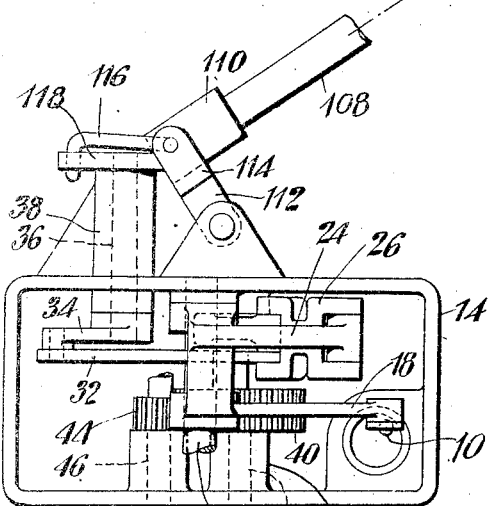
Fig. 5 is a top plan view of the mechanical movement parts and the casing thereof which is shown in Fig. 3.
Figure 6:
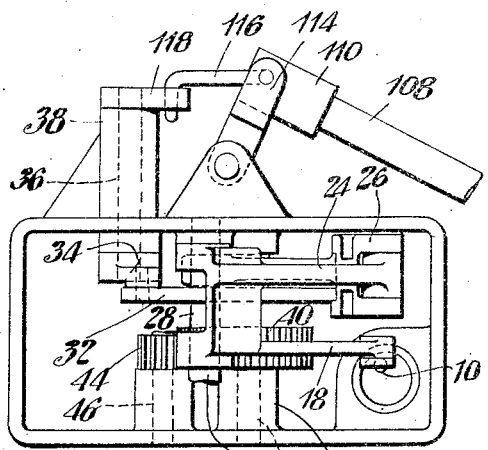
Fig. 6 is a top plan view of the mechanical movement parts and the frame thereon shown in Fig. 4.

The crank 28 is mounted on the side of a gear 40 pivoted on a stud 42 fixed in a boss 43 formed in the lower portion of the casing 14, see Fig. 5. The gear 40 meshes with a pinion 44 which is fixed on the main drive shaft 46 of the wind wheel, the shaft 46 in turn being journaled in bearings formed in the lower portion of casing 14.

Figure 7:
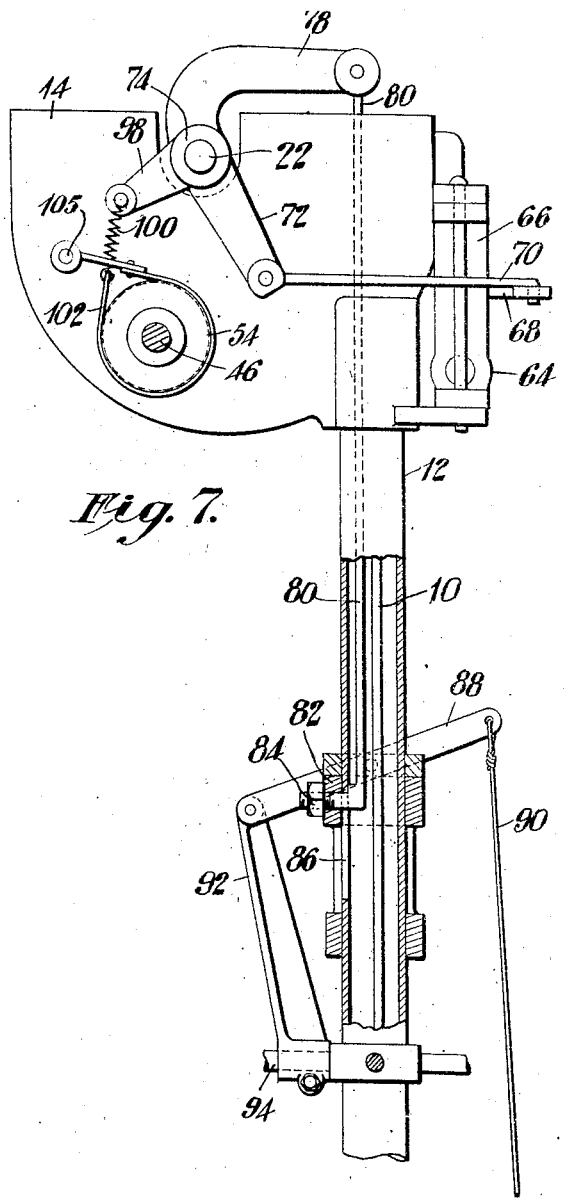
Fig. 7 is a view in side elevation with parts shown in section of the rudder vane shifting mechanism of the wind mill by which the operation of the mill is controlled.
Figure 8:
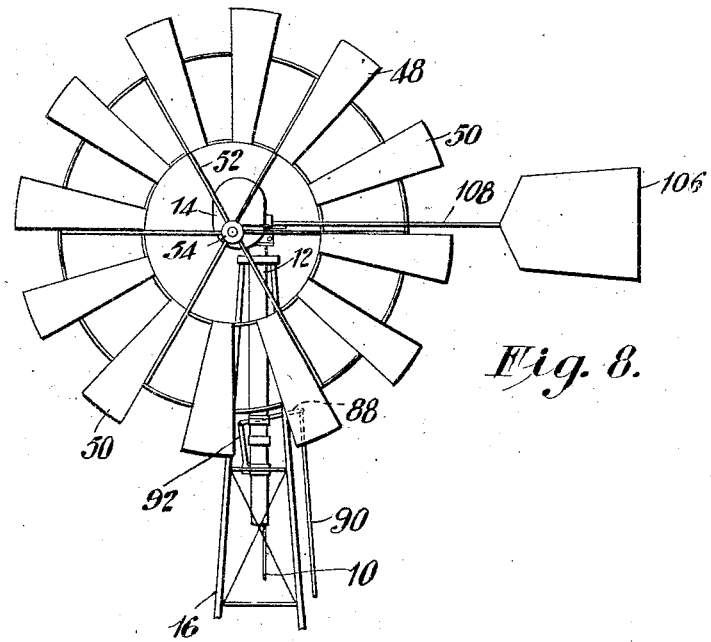
Fig. 8 is a view in side elevation of the top of a wind mill tower showing the mounting of the windmill, the guiding vane and the improved mechanical movement mechanism mounted on the tower.

The wind wheel 48 illustrated in Figs. 1 and 8 consists of a series of blades 50 which are secured to a frame work 52, the frame work in turn being secured to a hub 54. The hub 54 is fixed on the outer end of the shaft 46 by means of a nut 58. The wind wheel depends entirely for its power upon the wind and as usual in the operation of the wind wheel, a rudder is provided to hold the wheel directly in the wind. The rudder for the present wind mill is illustrated in Figs. 1, 2, 9, 10 and 11. This rudder consists of a vane 60 mounted on the outer end of a rod 62. The rod 62 is mounted in a socket 64 in a frame 66, Figs. 1 and 2, which is pivotally mounted on the left side of the casing 14. A forwardly extending arm 68 secured to the frame 66 is connected by means of a rod 70 with a laterally extending arm 72 on a compound lever 74. The lever 74 is pivotally mounted on the journal 22. The lever 74 has an upwardly and laterally extending lever 78, Fig. 7, which is connected by means of a vertically extending rod 80 with a slide 82, slidably mounted upon the lower end of the tube 12 projecting downwardly from the casing 14. The lower end of the rod 80 is turned outwardly and extends through an opening in the slide 82 and is secured to the slide by means of a bolt and nut connection 84, the outwardly extending end of the rod being mounted in a slot 86 in the tube 12. The slide 82 is arranged to be moved by means of a lever 88 and pull wire 90. The pull wire 90 extends from the lever 88 to the bottom of the mill tower where it may be normally manipulated for shifting the rudder. The end of the lever 88 opposite its connection with the pull wire 90 is pivoted to the upper end of a strut 92 which is mounted on a rod 94 comprising one of the parts of the structural frame work of the mill tower.

Figure 9:
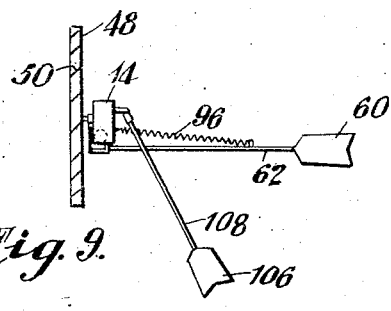
Fig. 9 is a diagrammatic view illustrating the relation of the wind mill, the control vane, and the rudder to provide the long stroke position of the operating mechanism.
Figure 10:
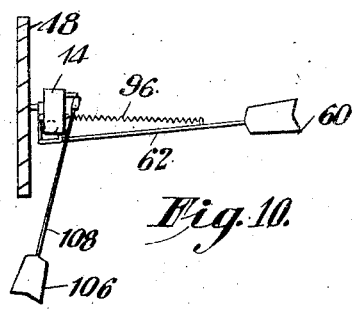
Fig. 10 is a diagrammatic view illustrating the relation of the windmill, the control vane, and the rudder to provide the short stroke position of the operating mechanism.
Figure 11:
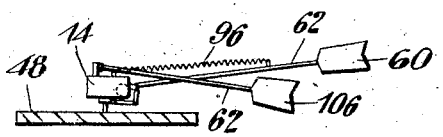
Fig. 11 is a diagrammatic view illustrating the position of the windmill controlling vane and the rudder to hold the windmill out of the wind so that the mill will be inoperative.

The rudder vane 60 is normally held in the position illustrated in Figs. 1, 2, 9 and 10 by means of a tension spring 96 which is connected between the frame 14 and the rod 62. When the rudder vane is in the position shown in Figs. 9 and 10 the operating slide and pull wire mechanism is held in the position illustrated in Fig. 7. The position of the rudder vane which is illustrated in Figs. 9 and 10 is the normal operating position of the wind wheel wherein the rudder vane acts to hold the wheel directly in the wind. When it is desired to throw the wheel out of the wind and thus hold it in inoperative position, the pull wire 90 is pulled downwardly which in turn moves the slide downwardly, and throws the vane into the position illustrated in Fig. 11 wherein the vane rod 62 is in substantially parallel position with the plane of the face of the wind wheel. At the time the rudder vane is moved into position to hold the wind wheel from operation, a brake band is tightened on the hub of the wind wheel to restrain the wheel from operation. To accomplish this a downwardly extending arm 98, Figs. 2 and 7, on the lever 74 is connected by means of a spring 100 with a brake band 102, Figs. 1 and 7. The brake band 102 is mounted in a groove 104 on the inner face of the hub 54. The brake band surrounds the hub and has one end fixed to a pin 105 projecting outwardly from the face of the frame 14. As the arm 98 on the lever 74 is moved upwardly by the operation of the pull wire 90 and its connection with the compound lever 74, the brake band will be tightened to lock the wind wheel from rotation.

When the pressure or velocity of the wind is comparatively low the power exerted on the wind wheel is not high. Therefore it is desirable that the pumping stroke of the pump should be as short as possible to exert the lightest amount of load on the power driving mechanism. As the wind pressure increases it is desirable to increase the length of the pumping stroke in order to more effectively utilize the power of the wind for pumping. This change in the pumping stroke is effected in the present invention by means of the mechanical movement described above. To carry on the automatic adjustment of the pumping stroke a side vane 106, Figs. 1, 2 and 5 to 11 inclusive, is pivoted to the side of the driving casing and connected with the adjusting link 32 to effect the adjustment of the toggle joint 26. The vane 106 is secured to the outer end of a rod 108 and the inner end of the rod is mounted in a socket 110 forming the lower portion of a frame 112 which is pivotally mounted on the side of the frame 14, Figs. 1 and 2. In a lug 114 at the top of the frame 112 is mounted a rod 116 which in turn is connected with the upper end of an arm 118 secured to the outer end of the shaft 36, which is journaled in the bearing 38. As the vane 106 is revolved about its pivotal connection with the wind wheel casing the adjusting link 32 will be moved back and forth to vary the position of the pivot 30 with reference to the pivot 41, and this in turn acts to vary the length of the reciprocating stroke of the pump rod. The connections between the vane and the toggle joint are such that the wind pressure against the vane will tend to maintain the pivot 30 of the toggle joint in a fixed position in order to provide the desired working stroke of the pump. It will be noted further that when the vane is moved by the wind the connections between the vane and the pump rod tend to move the arm 18 of the lever 20 upwardly or to lift the work so that when the vane moves the mechanical movement from a position for a short stroke operation to a position for long stroke operation, the load is lifted. When the pressure on the vane is released the load tends to move the mechanical movement into a position to maintain the short stroke position. In Fig. 9 is diagrammatically illustrated the relationship of the wind mill side vane and rudder for providing the long stroke pumping operation. In Fig. 10 is shown the relationship of the wind wheel, rudder and side vane for maintaining the short stroke operation of the pump rod.

With the mechanism described above it is apparent that the mechanical movement is automatically adjusted in order to vary the pumping stroke. It will be obvious however that mechanism might be provided by which the length of the pumping stroke or the amplitude of vibration of the moving member might be manually varied. In any case however the mechanical movement embodying the present invention permits the automatic adjustment of the movement of the load while the power driving mechanism and the load continues in operation.

The construction illustrated and described above also is extremely simple and cheap and is adaptable for application to a very wide range of different kinds of machinery and apparatus.

The preferred form of the invention having been thus described, what is claimed as new is:

1. The combination of a load member, a lever pivoted on a fixed axis and connected with the load member, a power driving means, a pair of hinged links connected between the driving means and said lever, an adjusting means connected with a hinged joint of the said links.

2. The combination of a load member, a bell crank lever pivoted on a fixed axis and having one arm connected with the load member, a power driving means, a toggle joint connected between the driving means and the other arm of said lever and means for varying the position of the knuckle of the toggle joint during the operation of the driving means.

3. The combination of a load member, a lever pivoted on a fixed axis and connected with the load member, a power driving means, an adjustable link connecting the driving means with said lever and means for varying the effective point of application of the said link to said lever, said link being so connected between the power driving means and the lever that an approach of the point of application of the link to the fixed axis of the lever raises the load.

4. The combination of a load member, a lever pivoted on a fixed axis and connected with the load member, a power driving means, an adjustable link connecting the driving means with said lever, and means for varying the effective point of application of the link to said lever, said link being so connected between the power driving means and the load member that the weight on the load member normally acts to move the point of application of the link to said lever to cause a short stroke movement of the load member.

5. The combination of a load member, a lever pivoted on an axis and connected with the load member, a wind wheel fixed on a shaft, a crank operated from said shaft, a toggle connection between said crank and said lever, a rudder for holding said wheel in the wind and a vane connected with said toggle arranged to vary the effective point of application of the toggle to said lever.

6. In a wind mill, a casing, a lever mounted for oscillation in said casing, a load operating rod connected with said lever, a wind mill fixed on a shaft journaled in said casing, a crank geared to said shaft, a toggle joint connected between said crank and said lever, a wind rudder mounted on the said casing in position to hold said wind wheel in the wind, a side vane pivotally mounted on said casing and connected between said vane and toggle by which the position of the knuckle of the toggle joint may be varied.

7. In a wind mill, a casing, a lever mounted for oscillation in said casing, a load operating rod connected to said lever, a wind wheel fixed on a shaft journaled in said casing, a crank geared to said shaft, an adjustable link between said crank and said lever, a wind rudder mounted on the said casing in position to hold said wheel in the wind, a side vane pivotally mounted on said casing, and a connection between said vane and said link, said connection being such that the effective point of application of the link to said lever will approach the axis of said lever with an increase of wind velocity to increase the amplitude of oscillation of said load operating lever.

8. In a wind mill, a casing a lever mounted for oscillation in said casing, a load operating rod connected with said lever, a wind wheel fixed on a shaft journaled in said casing, a crank geared to said shaft, an adjustable link connected between said crank and said lever, a wind rudder mounted on said casing in position to hold said wheel in the wind, a side vane pivotally mounted on the said casing, a connection between said vane and said link by which the effective point of application of the link to said lever may be varied, and means for moving said rudder into and out of position for holding said wheel in the wind.

9. In a wind mill, a casing, a lever mounted for oscillation in the said casing, a load operating rod connected with said lever, a wind wheel fixed on a shaft journaled in said casing, a crank geared to said shaft, a toggle joint connected between said crank and said lever, a wind rudder mounted on said casing in position to hold said wheel in the wind, a side vane pivotally mounted on said casing, and a connection between said vane and said toggle, said connection being such that the load and the movement of the crank will move the toggle joint into short stroke position as the wind pressure on the side vane decreases.

10. The combination of a load member, a bell crank lever pivoted on a fixed axis at one point of action and having one arm connected with said member at another point of action, a power driving means, a third point of action on the other arm of said lever being adjustable with reference to said other two points of action and connected with said power driving means, and means for adjusting said three points of action independently of the application of the power driving means thereto.

11. The combination of a load member, a lever having two rigid arms, one arm being connected with the load member at one point of action of said lever, a power driving means, a hinged connection between the driving means and the second arm of the said lever at a second point of action, the pivot of said hinge being adjustable adjacent said second arm to vary a third point of action of the lever.

12. The combination set forth in claim 11 wherein means are provided for automatically adjusting said hinged pivot independently of the operation of the power means.

In testimony whereof I affix my signature.

EDWARD SKILLMAN.